United States Patent [19]
Hartman

[11] Patent Number: 5,976,011
[45] Date of Patent: Nov. 2, 1999

[54] STRAW AND CHAFF SPREADER ASSEMBLY

[76] Inventor: Everett A. Hartman, RR 1, Box 66, Conway Springs, Kans. 67031

[21] Appl. No.: 09/001,447

[22] Filed: Dec. 31, 1997

[51] Int. Cl.$^6$ ....................................... A01F 12/40
[52] U.S. Cl. ................... 460/111; 460/8; 460/901
[58] Field of Search .................. 460/111, 112, 460/8, 113, 119, 901

[56] References Cited

U.S. PATENT DOCUMENTS

| 4,617,942 | 10/1986 | Garner | 460/112 |
|---|---|---|---|
| 4,892,504 | 1/1990 | Scott et al. | 460/112 |
| 4,917,652 | 4/1990 | Glaubitz et al. | 460/111 |
| 5,021,030 | 6/1991 | Halford et al. | 460/112 X |

Primary Examiner—Thomas B. Will
Assistant Examiner—Arpad Fabian Kovacs
Attorney, Agent, or Firm—Kenneth Jack

[57] ABSTRACT

A straw and chaff spreading assembly consisting of a left spreader plate having a plurality of spreader fins fixedly attached thereto, a right spreader plate, having a plurality of spreader fins fixedly attached thereto, left spreader plate rotating means capable of rotatably mounting and upwardly angularly accelerating the left spreader plate, right spreader plate rotating means capable of rotatably mounting and downwardly angularly accelerating the right spreader plate; and, an oblongated straw and chaff deflecting shield fixedly mounted upon the rearward end of the harvester combine and positioned forward of the axes of rotation of the left and right spreader plates.

8 Claims, 5 Drawing Sheets

STRAW AND CHAFF SPREADER ASSEMBLY

FIELD OF THE INVENTION

This invention relates to mechanisms adapted for spreading straw and chaff which falls from the rear straw and chaff output port of an harvester combine. More particularly, this invention relates to such mechanisms which utilize dual spinning circular straw and chaff spreader plates.

BACKGROUND OF THE INVENTION

As a common harvester combine machine moves forward through a crop such as wheat, the wheat is cut and conveyed upwardly into the combine, and into a threshing cylinder mounted therein where the grain is stripped from the wheat stalks. The grain is then conveyed by the combine to a series of sieves where the chaff is blown away from the grain by blasts of air. The grain separated from the chaff is then conveyed within the combine to a grain chute, while the straw stalks and chaff are typically conveyed or blown rearwardly to fall upon the ground through a rear straw and chaff output port. In the absence of some mechanism for broadcast spreading the straw and chaff, the straw and chaff typically falls into elongated piles trailing behind the combine harvester.

Such piles of straw and chaff tend to soak up herbicide subsequently spread over the ground, preventing weed seeds underlying the piles from being killed. Thus, after a wheat harvest where such piling of straw and chaff is allowed, rows of undesirable weeds may grow. Where the straw and chaff is evenly spread over the ground, subsequent application of herbicide will effectively and consistently treat the ground and kill all weed seeds.

A known, but deficient, method of spreading straw and chaff emitting from the rear output port of a harvester combine is to rotatably mount a pair of circular spreader plates side by side beneath the combine's rear straw and chaff output port. Such spreader plates typically have spreader fins extending upwardly from their upper surfaces. Viewing such spreader plates from above, the plates are rotatably driven by gear driven axles so that the left spreader plate rotates in a clockwise direction, and so that the right spreader plate counter-rotates counter-clockwise. Such counter-rotation of the left and right spreader plates causes the spreader fins to propel straw and chaff rearwardly away from the harvester combine. A presumed advantage of such counter-rotation of the left and right spreader plates and fins is that straw and chaff falling from the output port upon the discs is not thrown by the fins forwardly toward the combine and toward the output port. A disadvantage of such counter-rotation of the left and right spreader plates and fins is that the straw and chaff is thrown rearwardly in a relatively concentrated stream, resulting in undesirable accumulation of the straw and chaff behind the harvester combine.

The instant inventive straw and chaff spreading assembly eliminates such undesirable rearward concentration of straw and chaff by reversing the counter-rotation of the spreader plates and by interposing an arcuately curved deflector shield between the spreader plates and the harvester combine; the shield accommodating for straw and chaff thrown forwardly by the spreader plates. The combined actions of the reverse counter-rotating spreader plates and the deflector shield results in true broadcast spreading of straw and chaff which emits from the straw and chaff output port of the harvester combine.

PRIOR ART PATENTS

U.S. Pat. No. 5,120,275 issued Jun. 9, 1992, to Zacharias discloses a chaff spreading attachment for combines.

German Patent No. DE 3824166 A1 issued Jan. 18, 1990, discloses a distributor for straw and chaff.

U.S. Pat. No. 1,501,460 issued Jul. 15, 1924, Klocke, et al., discloses a straw spreading machine.

German Patent No. DD 274943 A issued Jan. 10, 1990, discloses a straw ejector device for axial flow threshers.

U.S. Pat. No. 5,021,030 issued Jun. 4, 1991, to Halford, et al., discloses a straw spreader for a combine harvester.

U.S. Pat. No. 5,433,664 issued Jul. 18, 1995, to Bonde discloses an adjustable chaff spreader for a combine.

U.S. Pat. No. 4,892,504 issued Jan. 9, 1990, to Scott, et al., discloses a straw chopper and spreader assembly.

U.S. Pat. No. 5,215,500 issued Jun. 1, 1993, to Kirby discloses a straw and chaff spreading apparatus.

U.S. Pat. No. 4,917,652 issued Apr. 17, 1990, to Glaubitz, et al., discloses a grain and chaff spreading apparatus for a harvester thresher.

None of the above disclosed U.S. or German patents teach, disclose or describe the novel, inventive, useful and unique aspects, elements and features of the present inventive straw and chaff spreading assembly.

BRIEF SUMMARY OF THE INVENTION

The instant inventive straw and chaff spreader assembly comprises a pair of circular spreader plates, each spreader plate having a conical drive axle linkage extending upwardly and axially from its upper surface. Extending upwardly from the upper end of each such conical linkage is a drive axle, and fixedly mounted upon the upper end of each drive axle is an upwardly facing bevel gear. Upon the upper surfaces of each of the spreader plates are fixedly mounted a plurality of straw and chaff propelling fins, each fin extending radially outward. The bevel gear, axle, conical axle linkage and spreader plate assemblies are rotatably mounted upon the rearward end of an harvester combine, and are positioned side by side, and below the combine's straw and chaff output port. The assemblies are rotatably driven by an horizontal drive shaft having a leftward facing and a rightward facing bevel gear mounted thereon, the leftward facing bevel gear rotating the left spreader plate counter-clockwise as viewed from above, and the rightward facing beveled gear counter-rotating the right spreader plate in a clockwise direction. The outer ends of the fins of the spreader plates preferably are arcuately curved in the direction of their rotation.

A substantial portion of straw and chaff which falls onto spreader plates mounted for counter-rotation as described above is propelled forwardly toward the combine. To accommodate for such forwardly propelled straw and chaff, an oblongated straw and chaff deflecting shield is mounted in front of and directly adjacent to the spreader plates. Preferably, the right and left ends of the deflector shield are rearwardly curved, the curvature matching the circular periphery of the spreader plates. Also preferably, each of the ends of the deflector shield have adjustable extension plates mounted thereon for controlling the trajectories of straw and chaff propelled by the spreader fins.

In operation of the straw and chaff spreader assembly, straw and chaff falls rearwardly from the straw and chaff output port of a harvester combine upon which the assembly is installed. The straw and chaff falls onto the upper surfaces of the spinning spreader plates. The fins of the spreader plates come into contact with the straw and chaff and propel the straw and chaff forwardly onto the rearward facing surface of the deflector shield. The combined actions of the deflector plate and the counter-rotating spreader plates allow the fins of the spreader plates to broadcast the straw and chaff over a wide area behind the harvester combine, rather than, through opposite rotation, concentrating the straw and chaff in a stream of material extending rearwardly from the combine. Adjustment plates extending from the left and right ends of the deflector shield allow for selective adjustment of the broadcast angle of the straw and chaff.

Accordingly, it is an object of the present inventive straw and chaff spreader assembly to provide a dual circular plate spreader whose spreader plates counter-rotate for initial forward propulsion of straw and chaff; the assembly providing a straw and chaff deflecting shield interposed between the harvester combine and the spreader plates for broadcast spreading of the straw and chaff.

It is a further object of the present invention to provide such a straw and chaff spreader assembly which incorporates adjustment plates adjustably mounted upon the left and right ends of the deflector plate for adjustment of the broadcast angle of straw and chaff propelled by the spreader.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 1:
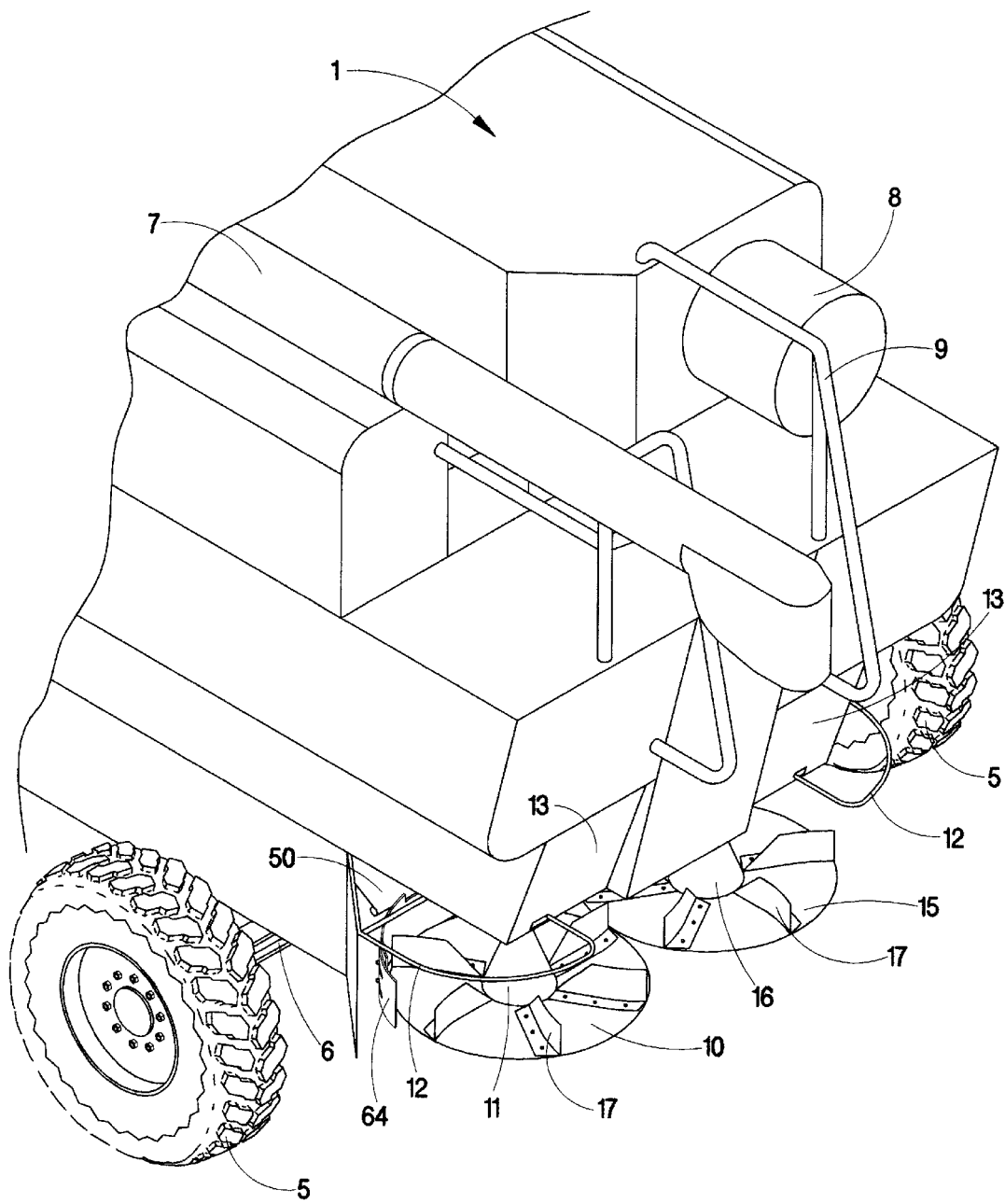
FIG. 1 is a partial isometric view of the rearward end of an harvester combine, the combine having installed thereon the instant inventive straw and chaff spreader assembly.

Referring now to the drawings, and in particular to FIG. 1, a common harvester combine 1 has a pair of rear tires 5 mounted upon a rear axle 6. A grain auger 7, an engine radiator air screen 8, and handrails 9 are mounted upon the upper structure of the harvester combine 1. A left spreader plate 10 and a right spreader plate 15 are rotatably mounted upon and downwardly extend from the rearward end of the harvester combine 1, the plates being suspended by conical axle linkages 11 and 16. The left spreader plate 10 and the right spreader plate 15 each have mounted thereon a plurality of spreader fins 17. Guard bars 12 are mounted over the spreader plates 10 and 15; and removable drive linkage cover plates 13 enclose the drive linkages.

Figure 2:
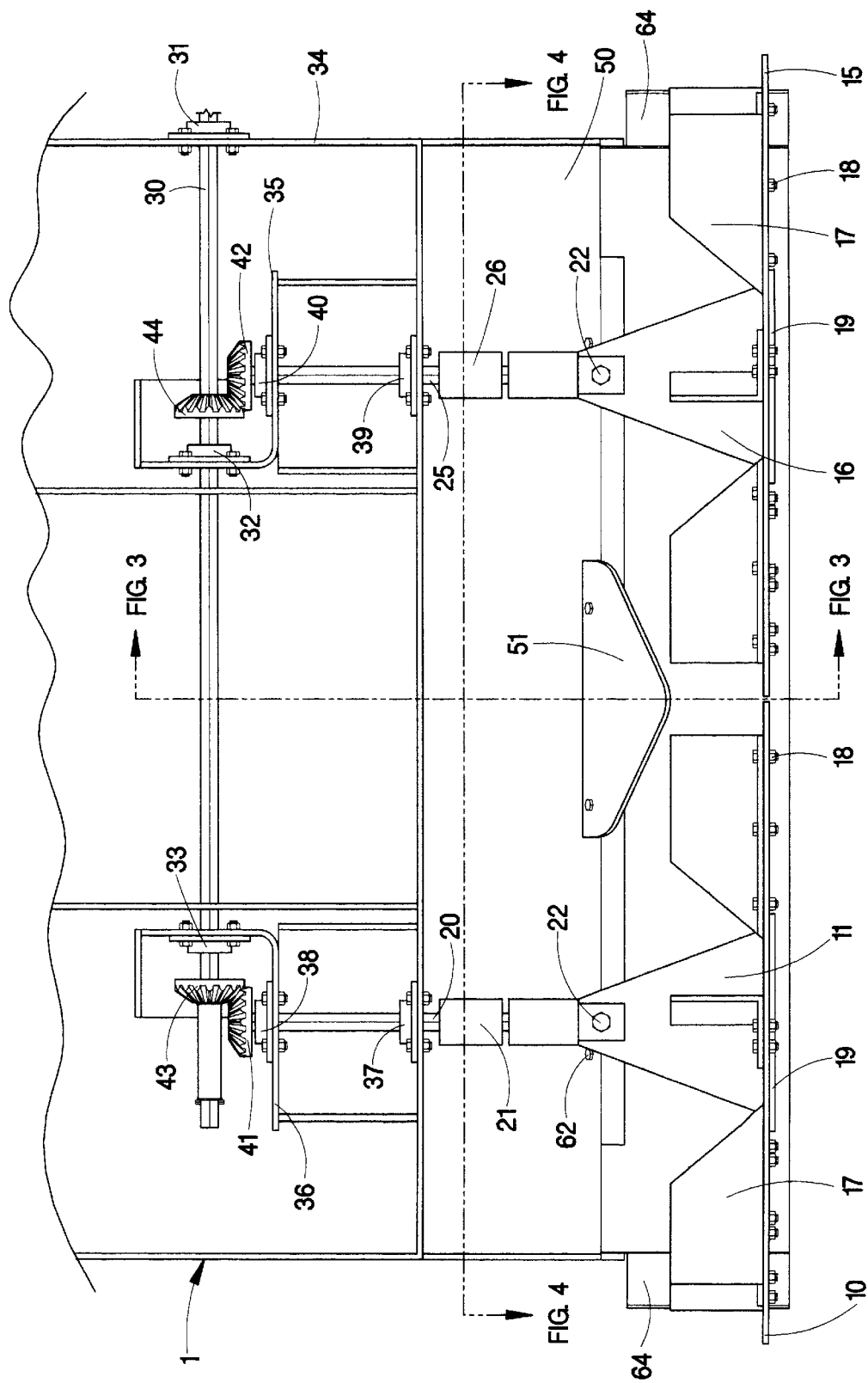
FIG. 2 is a partial rear view of the harvester combine depicted in FIG. 1, the view showing drive linkage cover plates removed.

Referring to FIG. 2, the spreader fins 17 are mounted upon the left and right spreader plates 10 and 15 by means of bolts and nuts 18. The conical axle linkages 11 and 16 have outwardly extending lower flanges 19 for secure suspension of the left and right spreader plates 10 and 15. A left axle 20 and a right axle 25 have a detachable linkages 21 and 26, such linkages being fixedly attached to the upper ends of the conical axle linkages 11 and 16 by means of bolts 22. A horizontally mounted hexagonal drive shaft 30 is rotatable by the drive mechanism (not shown) of the harvester combine 1 so that, upon such motion, the upper surface of the drive shaft 30, as viewed, moves out of the page while the lower surface moves into the page; the angular velocity of the drive shaft 30 being rightwardly directed. The horizontal hexagonal drive shaft 30 is rotatably supported by bearings 31, 32, and 33, which are respectively supported by the outer wall 34 of the combine 1, by a right axle support bracket 35, and by a left axle support bracket 36. The left axle 20 and the right axle 25 are similarly rotatably supported by bearings 37, 38, 39, and 40, which are also supported by the left axle support bracket 36 and by the right axle support bracket 35.

Fixedly and axially mounted upon the upper ends of the left axle 20 and upon the right axle 25 are left and right upward facing bevel gears 41 and 42, the left upward facing bevel gear 41 engaging with a leftward facing bevel gear 43 mounted upon the drive shaft 30, and the right upward facing bevel gear 42 engaging with a rightward facing bevel gear 44 also mounted upon the horizontal drive shaft 30. Upon rotation of the horizontal drive shaft 30 in the manner described above, the leftward facing and rightward facing bevel gears 43 and 44 counter-rotate the left and right upward facing bevel gears 41 and 42, which rotate the left axle 20 and the right axle 25, rotating the left spreader plate 10 and the right spreader plate 15.

Figure 3:
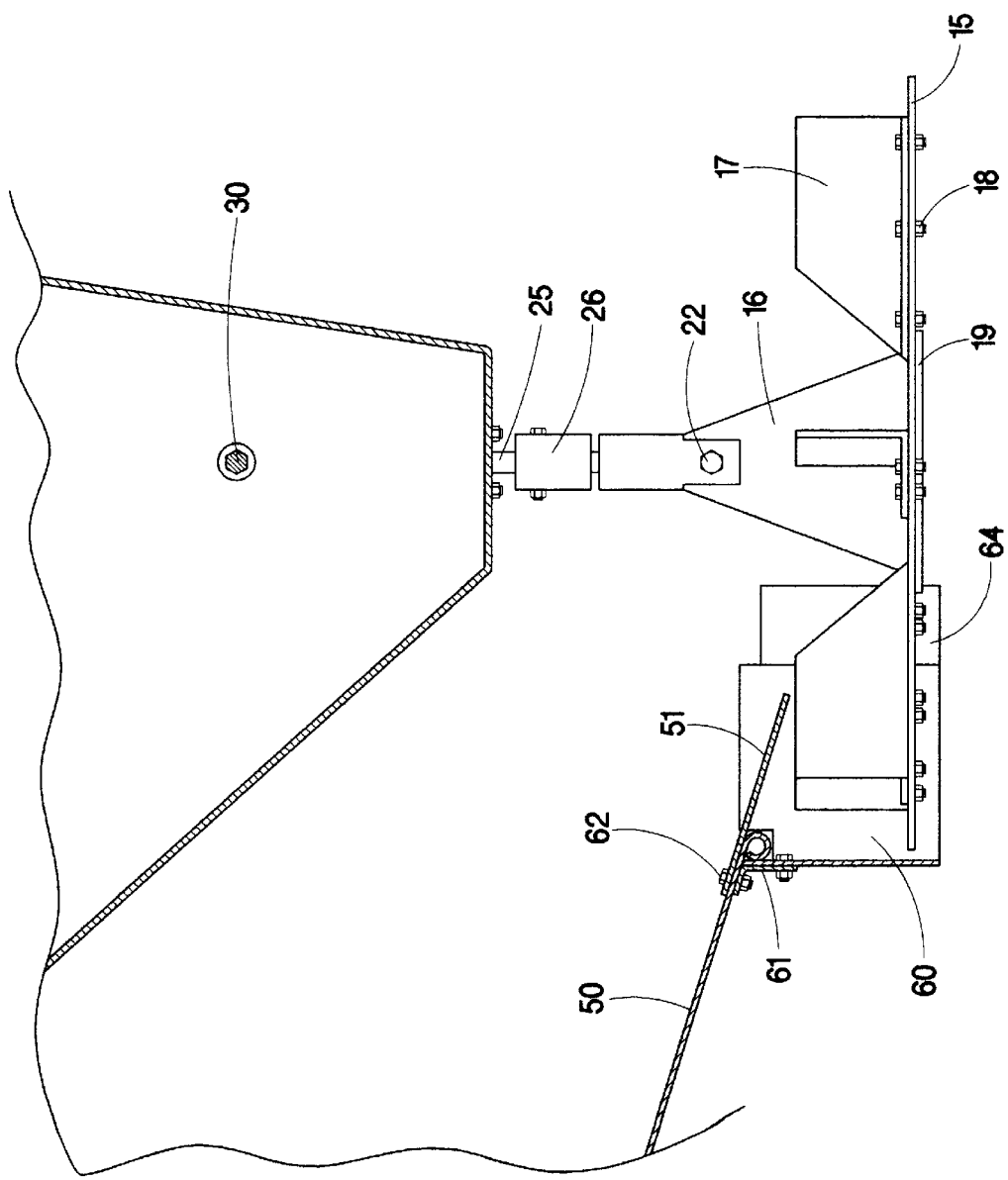
FIG. 3 is a side sectional view of the straw and chaff spreader assembly.
Figure 4:
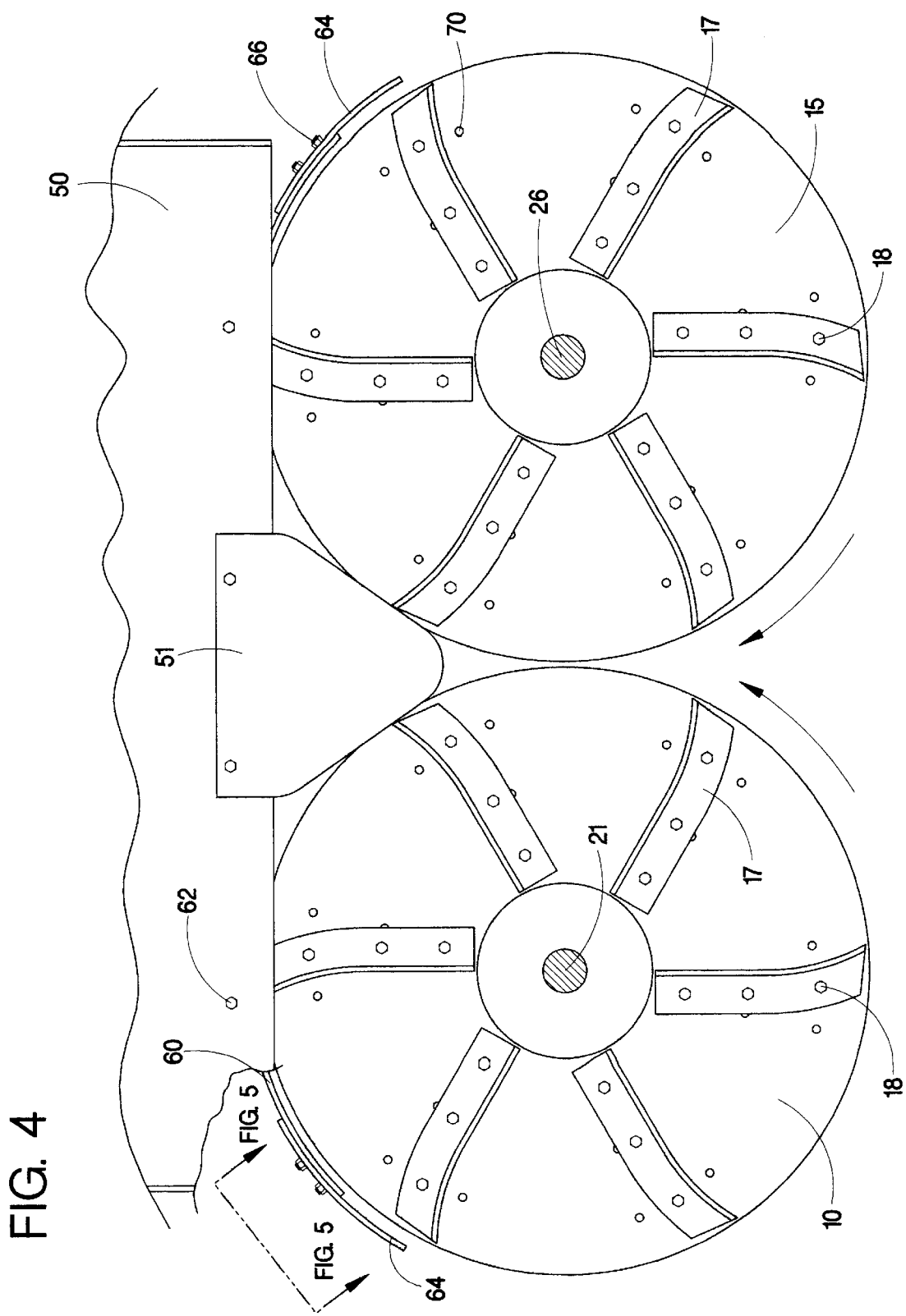
FIG. 4 is a plan view of the straw and chaff spreader assembly.
Figure 5:
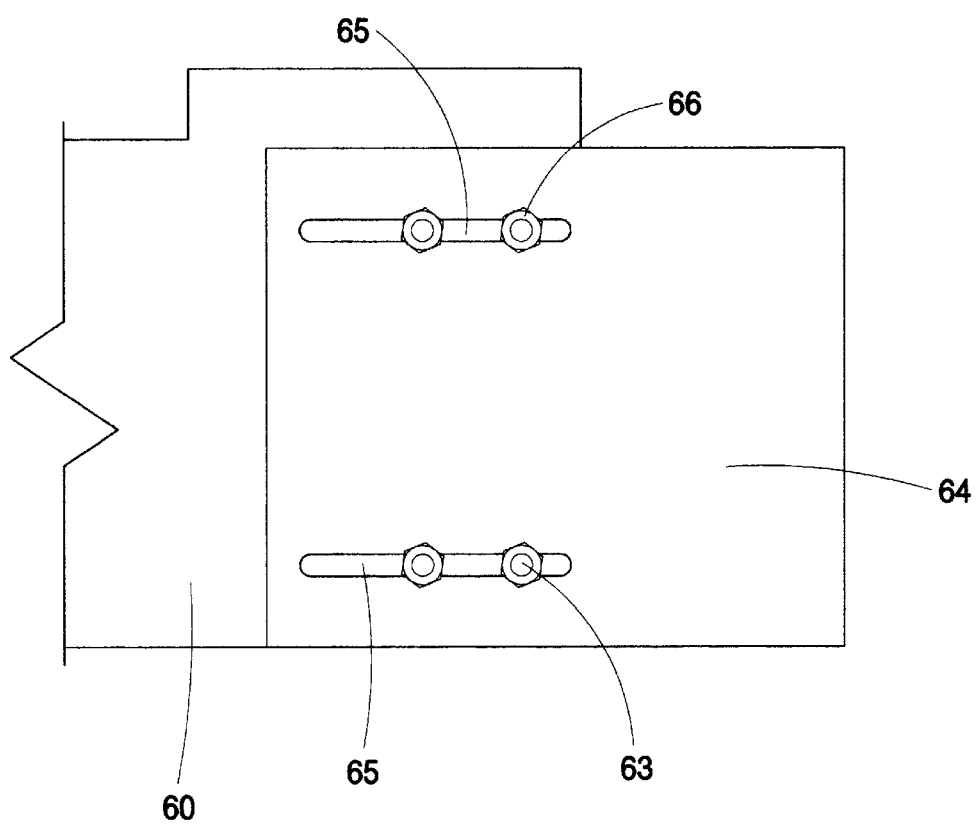
FIG. 5 is a detail of a left extension plate mounted upon the left end of a shield component of said assembly.

Referring to FIG. 4, the outer end of each spreader fin 17 is preferably curved in the direction of normal rotation of the spreader plate to which it is attached. Arrows drawn at the peripheries of the spreader plates delineate their directions of rotation; the angular velocity of the left spreader plate 10 being upwardly directed, and the angular velocity of the right spreader plate 15 being downwardly directed. Referring simultaneously to FIGS. 2 and 4, in operation, straw and chaff slides rearwardly along an angled floor 50 to fall upon the upper surfaces of the left spreader plate 10 and the right spreader plate 15. A triangular floor extension plate 51 prevents straw and chaff from falling downward to the ground between the spreader plates 10 and 15. Referring to FIG. 2, straw and chaff which falls upon the spreader plates 10 and 15 (at a central location between the left axle 20 and the right axle 25) is forwardly propelled by the spreader fins 17 against an oblongated straw and chaff deflecting plate 60. Referring to FIG. 4, the straw and chaff deflecting plate 60 has rearwardly curved left and right ends. Referring to FIG. 3, the straw and chaff deflecting plate 60 is mounted to extend downwardly from the lower surface of the angled floor 50 by means of an angle bracket 61 which is bolted to the deflector plate 60 and to the angled floor 50 by means of nuts and bolts 62. Referring to FIG. 5, the left and right ends of the deflector plate 60 have four threaded lugs 63 extending forwardly therefrom. The four threaded lugs 63 serve as mounting posts for curved extension plates 64. Lateral slots 65 within the extension plates 64 allow the extension plates 64 to be adjustably extended or retracted by tightening and loosening threaded nuts 66 mounted over the threaded lugs 63.

Referring to FIG. 3, in operation of the straw and chaff spreader assembly, the right spreader plate 15 rotates so that the spreader fin 17 closest to the viewer, as viewed, travels from right to left. Straw and chaff slides rearward and downward along the upper surface of the angled floor 50 and falls onto the upper surface of the spreader plate 15. The spreader fins 17 then contact the straw and chaff and propel the straw and chaff forwardly against the rearwardly facing surface of the straw and chaff deflecting plate 60. The combined actions of the rotating spreader fins and the deflector plate 60 cause the straw and chaff to be deflected sideways (into the page as viewed) and outward in the direction of the curvature of the right end of the deflector plate 60.

Referring to FIG. 4, extension of the curved extension plates 64 narrows the broadcast angle of straw and chaff propelled by the spreader fins 17, and retraction of the adjustment plates 64 widens the broadcast angle. The angular positions of each spreader fin 17 may be also adjusted for maximum efficiency in propelling chaff and straw through use of alternate bolt receiving apertures 70.

Referring simultaneously to FIGS. 3 and 4, counter-rotation of the left and right spreader plates 10 and 15 propels straw and chaff forwardly and outwardly against the straw and chaff deflecting plate 60, resulting in widespread and even broadcasting of straw and chaff while eliminating undesirable central concentrations of straw and chaff which would result from opposite rotation of the spreader plates.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A straw and chaff spreader assembly for spreading straw and chaff which emits from a rear straw and chaff output port of a harvester combine, the harvester combine having a forward end, a rearward end, a left side, and a right side, the straw and chaff spreading assembly comprising:

(a) a left spreader plate having an upper surface, having a plurality of spreader fins fixedly attached to and extending upwardly from said upper surface, and having an axis of rotation extending upwardly from said upper surface;

(b) a right spreader plate, having an upper surface, having a plurality of spreader fins fixedly attached to and extending upwardly from said upper surface, and having an axis of rotation extending upwardly from said upper surface;

(c) left rotatable mounting means, such means mounting the left spreader plate upon the rearward end of the harvester combine beneath its rear straw and chaff output port;

(d) right rotatable mounting means, such means mounting the right spreader plate upon the rearward end of the harvester combine beneath its rear straw and chaff output port, and to the right of the left spreader plate;

(e) counter-clockwise rotating means operatively connected to the left spreader plate, the counter-clockwise rotating means being capable of rotating the left spreader late so that the direction of its angular velocity is upward;

(f) clockwise rotating means operatively connected to the right spreader plate; the clockwise rotation means being capable of rotating the right spreader plate so that the direction of its angular velocity is downward; and, (g) an oblongated straw and chaff deflecting shield, such shield being fixedly mounted upon the rearward end of the harvester combine and positioned forward of the axes of rotation of the left and right spreader plates; such shield being capable of rightward and leftward deflection of straw and chaff which is forwardly propelled by the spreader fins of the left and right spreader plates.

2. The assembly of claim No. 1, wherein the counter-clockwise and clockwise rotating means comprise left and right gear driven drive axles, each such drive axle having an axis of rotation respectively coinciding with the axes of rotation of the left and right spreader plates.

3. The assembly of claim No. 2, wherein the oblongated straw and chaff deflecting shield has a rearwardly curved left end and a rearwardly curved right end.

4. The assembly of claim No. 3, wherein the left and right spreader plates are circular, and wherein the rearward curvatures of the left and right ends of the oblongated straw and chaff deflecting shield are arcuate.

5. The assembly of claim No. 4, further comprising left and right deflector shield extension plates, such plates being adjustably mounted upon the left and right ends of the oblongated straw and chaff deflecting shield for leftward and rightward extensions of such shield.

6. The assembly of claim No. 5, wherein the left and right deflector shield extension plates are rearwardly curved.

7. The assembly of claim No. 6, wherein the gear drives of the left and right drive axles comprise an horizontal drive axle capable of rightward angular acceleration, left and right upwardly facing bevel gears respectively fixedly mounted upon the upper ends of the left and right gear driven drive axles, a left facing bevel gear fixedly mounted and positioned upon the horizontal drive axle for engagement with the left upwardly facing bevel gear, and a right facing bevel gear fixedly mounted and positioned upon the horizontal drive axle for engagement with the right upwardly facing bevel gear.

8. The assembly of claim No. 7, wherein each spreader fin has an inner end and an outer end, and wherein each such outer end is arcuately curved in the direction of rotation of the spreader plate to which it is attached.

* * * * *